United States Patent
Ramsl

(10) Patent No.: US 10,977,031 B2
(45) Date of Patent: Apr. 13, 2021

(54) METHOD FOR A SOFTWARE DEVELOPMENT SYSTEM

(71) Applicant: SAP SE, Walldorf (DE)

(72) Inventor: Hans-Martin Ramsl, Mannheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/657,118

(22) Filed: Oct. 18, 2019

(65) Prior Publication Data

US 2020/0183681 A1 Jun. 11, 2020

(30) Foreign Application Priority Data

Dec. 11, 2018 (EP) .................................... 18211699

(51) Int. Cl.
*G06F 8/73* (2018.01)
*G06F 8/30* (2018.01)

(52) U.S. Cl.
CPC . *G06F 8/73* (2013.01); *G06F 8/30* (2013.01)

(58) Field of Classification Search
CPC ..... G06F 8/31; G06F 8/33; G06F 8/73; G06F 8/77; G06F 8/30
See application file for complete search history.

(56) References Cited

U.S. PATENT DOCUMENTS

| | | | | |
|---|---|---|---|---|
| 2011/0271253 A1* | 11/2011 | Bnayahu | ............. | G06F 11/3676 717/123 |
| 2017/0286103 A1* | 10/2017 | Caritos, II | ................ | G06F 8/73 |
| 2018/0060067 A1* | 3/2018 | He | ..................... | G06F 11/3612 |
| 2018/0246856 A1* | 8/2018 | Kataoka | ................ | G06F 40/284 |

OTHER PUBLICATIONS

"Communication pursuant to Article 94(3) EPC—Office Action", dated Apr. 15, 2020 (dated Apr. 15, 2020), for Application No. 18211699.6-1224, 5pgs.
"Communication: EP Extended Search Report", European Patent Office, dated Jun. 11, 2019 (dated Jun. 11, 2019), for European Application No. 18211699.6-1224, 9pgs.
Ye, Xin et al., "From Word Embeddings to Document Similarties for Improved Information Retrieval in Software Engineering", 2016 IEEE/ACH 38th IEEE International Conference on Software Engineering, 2016, ISBN: 978-1-4503-3900-1, DOI: 10.1145/2884781. 2884862, (pp. 404-415, 12 total pages).
"Communication pursuant to Article 94(3) EPC—Office Action", dated Nov. 29, 2019 (dated Nov. 29, 2019), for Application No. 18211699.6-1224, 5pgs.

* cited by examiner

*Primary Examiner* — Wei Y Zhen
*Assistant Examiner* — Amir Soltanzadeh
(74) *Attorney, Agent, or Firm* — Buckley, Maschoff & Talwalkar LLC

(57) ABSTRACT

The present disclosure relates to a method for a software development system, the software development system comprising a code repository storing source code. The method comprises: receiving at the code repository an additional code; receiving at one or more documentation repositories documentation information for documenting the source code; generating corpus-based semantic word embeddings for code and documentation words of the source code and the documentation information; using the word embeddings for mapping by the software development system the source code to corresponding documentation; storing the mapping of the source code to the corresponding documentation.

19 Claims, 5 Drawing Sheets

110

```
1 #include „lib1.h„
2 #include „lib2.h„          201A 3 float getKidsMeanWeight
4      {
5
6        Input=sum(a,b);
7        Instructio1;
8        lib1Funct();
9      }                     201B
```

//calculate the average weight of
//population; having age smaller
//than 10 years

203A

...

```
1000 float sumValues
1001    { W1=2; W2=4;
1002 sum=(W1*a+W2*b)/2;
1003      return sum;
1004    }              201N
```

//calculate the sum in accordance
//with weights that are assigned
//differently depending on the
//sex and location of weighted
//person                    203N

//calculate the average weight of
//population; having age smaller
//than 10 years

213A

...

//calculate the sum in accordance
//with weights that are assigned
//differently depending on the
//sex and location of weighted
//person                    213N

Fig. 2B

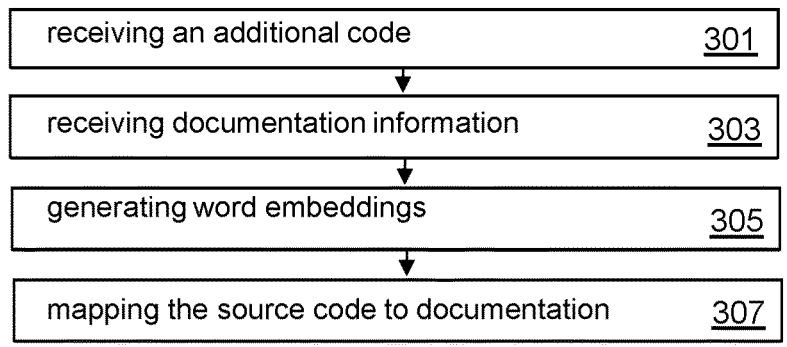
Fig. 3
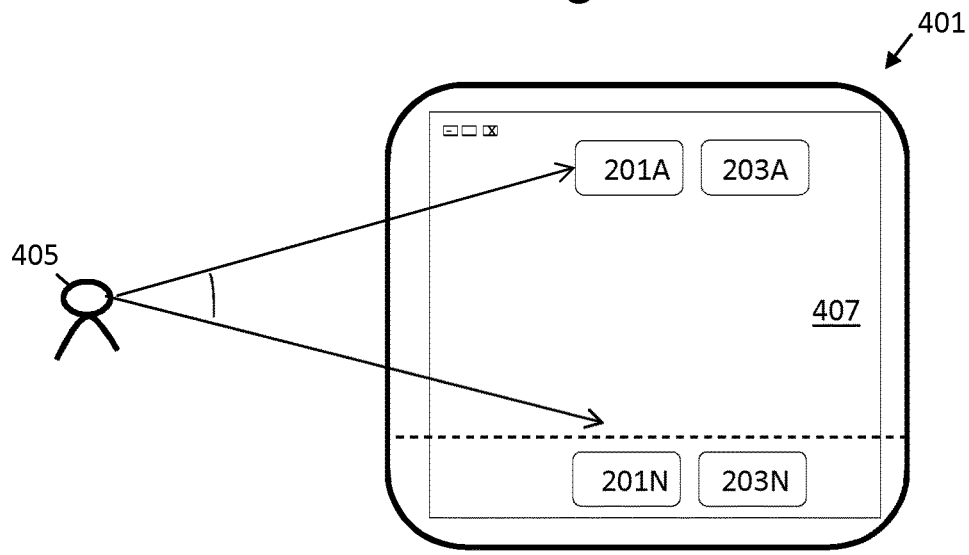
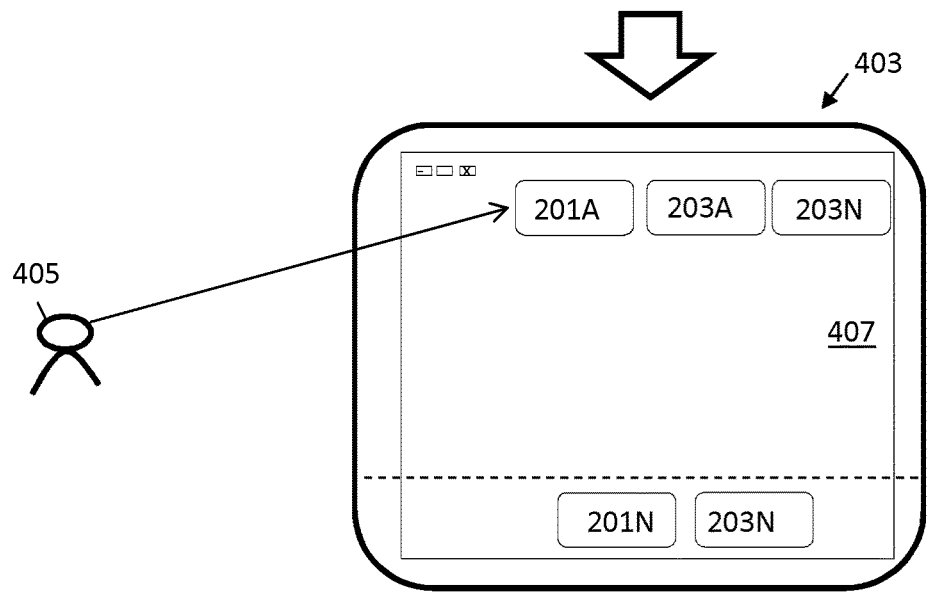
Fig. 4

METHOD FOR A SOFTWARE DEVELOPMENT SYSTEM

CROSS-REFERENCE TO RELATED APPLICATIONS

The present application claims priority under 35 U.S.C. § 119(a) to EP Patent Application No. 18211699.6, filed Dec. 11, 2018, the contents of which are incorporated herein by reference for all purposes.

FIELD

The disclosure relates to computer systems, and particularly to a method for a software development system.

BACKGROUND

Software development may comprise at least a process of programming and documenting that is involved in creating and maintaining applications, frameworks, or other software components. However, the process of programming and the process of documenting may be independent processes. This may, for example, lead to a considerable misuse of processing resources when querying for a feature or function in a code and for an exact remote or local storage location of corresponding documentation.

SUMMARY

It is an objective of embodiments of the invention to provide for a method for a software development system, computer program and a system. Said objective is solved by the subject matter of the independent claims. Advantageous embodiments are described in the dependent claims.

In one aspect, the invention relates to a method for a software development system, the software development system comprising a code repository storing source code. The method comprises:
  receiving at the code repository an additional code;
  receiving at one or more documentation repositories documentation information for documenting the source code;
  generating corpus-based semantic word embeddings for code and documentation words of the source code and the documentation information;
  using the word embeddings for mapping by the software development system the source code to corresponding documentation;
  storing the mapping of the source code to the corresponding documentation.

In another aspect, the invention relates to a computer program comprising machine executable instructions for execution by a processor, wherein execution of the machine executable instructions causes the processor to perform the method of the preceding embodiments.

In another aspect, the invention relates to a system being configured for:
  receiving a source code;
  generating corpus-based semantic word embeddings for code words of the source code and for documentation words of documentation information;
  using the word embeddings for mapping the source code to corresponding documentation;
  storing the mapping of the source code to the corresponding documentation.

It is understood that one or more of the aforementioned embodiments may be combined as long as the combined embodiments are not mutually exclusive.

The details of one or more implementations are set forth in the accompanying drawings and the description below. Other features will be apparent from the description and drawings, and from the claims.

BRIEF DESCRIPTION OF THE DRAWINGS

FIG. 2A shows an example content of a code file.

FIG. 2B shows an example content of a documentation file.

FIG. 3 is a flowchart of a method for mapping code to documentation information.

FIG. 4 is a diagram illustrating a method for rendering the source code of the code repository in accordance with an example of the present disclosure.

Like reference symbols in the various drawings indicate like elements.

DETAILED DESCRIPTION

Figure 1:
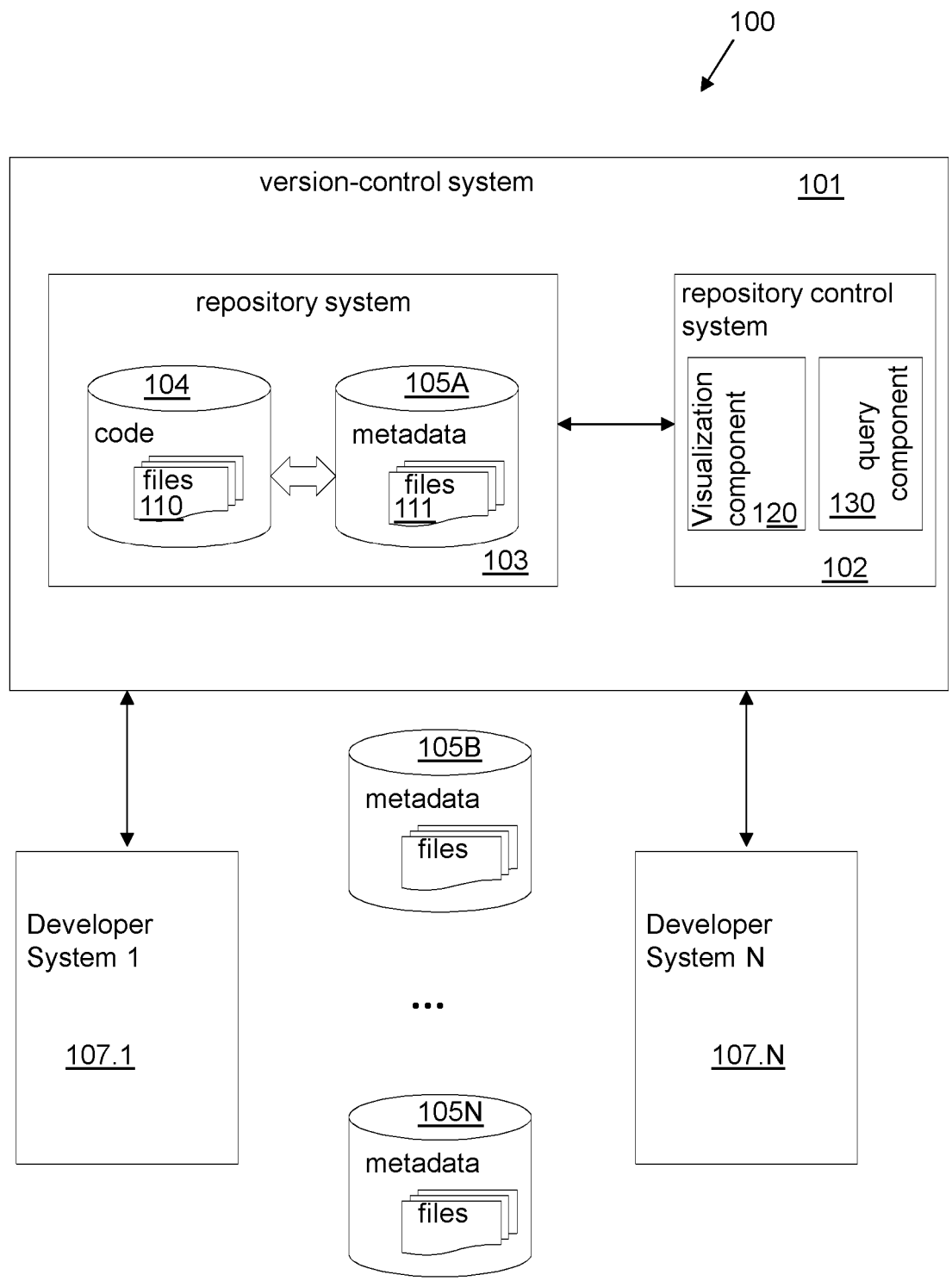
FIG. 1 depicts a block diagram of a software development system in accordance with an example of the present disclosure.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The software development system may enable software development. The process of programming and the process of documenting may be asynchronous processes. The present method may keep the code repository in synchrony with documentation repositories. The present method may enable a documentation integration capability that eliminates redundant data input and may allow seamless information flow between disparate systems. This may save processing time and may maintain data integrity and accuracy as well. This may enable users to share and collaborate on files and documents, regardless of their location.

The stored mapping may enable an efficient query of both the source code and the documentation information. For example, instead of performing two searches on the source code and the documentation information and then combining the two result searches, with the present method a single search may be sufficient and the result may comprise both, the searched source code and corresponding documentation information. This may particularly be advantageous as repository systems are usually queried by a high number of users. For example, the method may comprise in response to receiving one or more queries, retrieving information requested by the queries from the stored mapping.

Providing the source code and associated documentation may enable to accurately identify the different components of the software development system. Those components may be used to better control the function of the software development system. For example, a software design pattern may accurately be determined using the stored mapping. Using this pattern makes it is easier to identify how the corresponding classes and methods interact. This may speed up the development process of the software development system.

The source code of the code repository may be stored in one or more code files. The software development system may use a predefined access control rule for controlling access to the content of the code repository. For example, each of the code files may be assigned a respective list of permissions, access control list (ACL). The ACL may specify which users or system processes are granted access to the respective code file, as well as what operations are allowed on the code file. For example, some code files may be accessible to everyone and other files might require to limit access to only defined users. This may, for example, enable to determine a private and public repository components of the code repository.

The stored mapping may fulfill the same access control rule. For example, the mapping comprises code-documentation files, wherein each code-documentation file comprises content of a code file in association with respective documentation information. The code-documentation file may have the same access rule definition as the respective code file. This may prevent that important and sensitive information being exposed in the software development system to the wrong people e.g. because the documentation information may have a different access control rule. This problem of information exposure may not be relevant in case the documentation and the source code are separate.

The source code may be a collection of code, possibly with comments. The documentation information may further comprise these comments. For example, the source code may be processed for identifying the comments and the documentation information used for generating the word embeddings may further comprise the identified comments.

The corpus-based semantic word embeddings are word vectors. The word vectors are vectors of real numbers that represent the respective words. The vector representation of a word may use the information based on the context, the word is present in. The use of the vector representation of the words of the development system may enable to identify irregular commit operations in the software development system.

For example, a corpus of text may be used to produce a vector space with each unique word in the corpus being assigned a corresponding vector in the space. Word vectors are positioned in the vector space such that words that share common contexts in the corpus are located in close proximity to one another in the space. For example, the word embeddings may be determined using a frequency based embedding method or a prediction based method. The word embeddings resulting from the frequency based embedding method, may be co-occurrence vectors. For example, given two documentation files D1 and D2, containing a text as described below, co-occurrence vectors can be generated based on co-occurrence statistics of bigrams and further mathematical operations as follows.

D1: this class describes how to delete and create a user
D2: a user can be in one class or another

|  | describes | how | delete | create |
|---|---|---|---|---|
| Class | 1 | 0 | 0 | 0 |
| User | 0 | 0 | 0 | 1 |

According to one embodiment, the method further comprises rendering by a visualization component of the software development system the source code and the corresponding documentation, thereby enabling a focused view of the mapping of code to documentation. The mapping of the source code to documentation may result in mapping multiple code components of the source code to respective documentation information. For example, the components of the source code and corresponding documentation may be rendered side by side. A code file of the source code may be displayed such that for each mapped code component of the code file, a window e.g. pop-up window comprising the respective documentation may be displayed near that code component.

This embodiment enables a method of presenting information producing in the mind of the user an effect which depends on human physiology that can be precisely defined. Displaying the source code in association with corresponding documentation on a screen near the user's current visual focus of attention has the technical effect that the association of the code and documentation information is more or less guaranteed to be seen immediately (compared to a separate placement of the code and documentation on the screen).

According to one embodiment, at least one repository of the one or more documentation repositories is remotely connected to the software development system. This may enable to seamlessly integrate the present method in existing systems. This may increase the flexibility implementation of the software development system. For example, the software development system may be limited to software development while remote systems may be used for providing documentation information.

According to one embodiment, the mapping comprises: for each code component of the source code identifying zero or more documentation components of the documentation information that are semantically similar to the code component by performing a predefined vector operation on the code word embeddings of the code component and documentation word embeddings of the documentation components. The semantic similarity (lexical semantic similarity) may be quantified by comparing vectors. The predefined operation may, for example, be a cosine similarity.

The documentation information may, for example, be split into documentation components. The documentation components may, for example, be user defined. In another example, the documentation components may automatically be defined e.g. by assigning a random number of lines to each documentation component.

A code component comprises one or more code lines of the source code. The code component may, for example, be defined while performing the mapping. For example, for each code line of the source code a corresponding documentation component may be identified. If consecutive code lines share the same documentation information, these consecutive code lines may form a code component.

In another example, documentation components may be determined based on the lexical structure of the source code. The lexical structure of a source code may depend on the programming language of the source code. For example, a code component may be a block of the source code that is delimited by curly braces. Alternatively or in addition a code component may comprise a code line that involves a class or a function name.

This embodiment may enable a systematic and accurate approach for mapping the source code to the documentation.

According to one embodiment, the mapping comprises for each first code component of the source code, identifying one or more second code components of the source code that are dependent of the first code component, for each component of the first and second code components identifying zero or more components of the documentation information that are semantically similar to the component by performing a predefined vector operation on the code word embeddings of the component and documentation word embeddings of the documentation components, and associating the identified components with the first code component of the source code. The associating of the identified components with the first code component of the source code further comprises displaying side by side the identified components with the first code component.

The design of a source code may be very complex making the access to documentation information very difficult and resource consuming. For example, a code line (e.g. at the beginning) of a given code file refers to or calls a function that is defined in other code lines (e.g. at the very end) of the given code file or in another code file. If the documentation information comprises comments of the source code, the access to documentation information of that code line without the present method may require scrolling top an down in order to read the comments related to that code line as well as comments to the called function. With the present method both documentation information may be associated with that code line making access to it efficient and less resource consuming. With regard to the documentation information obtained from documentation files (e.g. different from the comments inside a code file), the present method may prevent downloading each documentation file associated with the dependent components i.e. this may prevent the following case: if two code components are dependent, the user may have to download two documentation files each time he or she wants to understand the code component.

According to one embodiment, the mapping comprises: computing the similarity between the code word embeddings of code components of the source code and the documentation word embedding of documentation components of the documentation information using a predefined vector operation; identifying pairs of code components and documentation components that are similar using the computed similarity, and assigning each code component of an identified pair to a respective documentation component of the identified pair.

According to one embodiment, the method further comprises before computing the similarities, excluding code components, of the source code, comprising import statements. This may prevent biased mapping results. For example, different code files of the source code may comprise the same import statements and theses import statements may be a dominating portion of the code files. Thus, the resulting similarity metric is dominated by the import statements. This may result in the different code files having the same documentation information although they may contain different programming logics. In other terms, since import statements are contained in every code file, they can be considered "technical stop words". E.g. two short code files which contain the same import statements can be calculated to be very similar (merely based on the import statements), even if they contain very different implementations logics. By removing the import statements, the vector representation of each code file becomes more discriminative and thus can more easily be assigned to a documentation component.

According to one embodiment, the method further comprises computing a documentation coverage metric indicative of the number of code components that are mapped to documentation components of the documentation information and the code components which are not mapped with documentation components, of the documentation information and using the documentation coverage metric for controlling the commit of documentations and/or codes of the software development system.

For example, if the documentation coverage metric falls below a predefined value (e.g. a previous value of that metric), the code and/or documentation commit may be blocked by the software development system. For example, if the documentation coverage metric falls below the predefined value, the commit of additional code may be blocked by the software development system until further documentation is provided and the metric becomes higher than the predefined value. That way, the software development system ensures that the documentation coverage always increases and in the worst case stays the same. This embodiment may enable a systematic control of the software development based on accurate metrics. This may enable to identify irregular software and/or documentation commits.

According to one embodiment, the generating of the corpus-based semantic word embeddings comprises generating code word embeddings for code words of the source code; generating documentation word embeddings for documentation words of the documentation information, weighting the code word embeddings, and combining the weighted code word embeddings and the documentation word embeddings. The code word embeddings get higher weights, since code is more compact and not as verbose as documentation. This may increase the mapping accuracy of the present method.

According to one embodiment, the receiving of the additional code and the receiving of the documentation information are asynchronously performed. The mapping may enable a synchronization of the programing process and documenting process.

According to one embodiment, the generating of the word embeddings comprising: providing a corpus of code words of source codes and documentation words of documentation information; determining at least one window of a predefined length indicating the number of words that can surround a given word of the corpus, wherein the length of the at least one window is determined using the structure of the source code and/or the structure of documentation files; building a training set from the corpus using the determined window; training a neural network algorithm on the training set, wherein the word embeddings are word vectors of a weight matrix of the neural network.

The corpus may comprise code words and documentation words that can be obtained from code files that have commented code. In this case, a single window may be used for generating the training set from the corpus. This window may be a symmetric or an asymmetric window.

In another example, the corpus may comprise a code corpus of code words obtained from code files and a documentation corpus of documentation words obtained from documentation information. The at least one window may comprise a code window and a documentation window.

The code window may be same as or different from the documentation window. The code window may indicate the number NLc of neighboring or adjacent words on the left side of the given word in the code corpus. The code window may further indicate the number NRc of neighboring or adjacent words on the right side of the given word in the code corpus. The documentation window may indicate the number NLd of neighboring or adjacent words on the left side of the given word in the documentation corpus. The documentation window may further indicate the number NRd of neighboring or adjacent words on the right side of the given word in the documentation corpus. In one example, NLc=NRc=NLd=NRd e.g. the code window is the documentation window.

According to one embodiment, the method further comprises calculating the ratio of the total amount of characters and lines of code in the source code, and using the ratio for determining the length of the window. This may enable to configure the training based on the characteristics of the software development systems. The window of this embodiment may be used for both the code corpus and documentation corpus. In another example, this window may be used for the code corpus only, and another different window may be used for the documentation corpus.

In another example, the code window may be determined based on the naming convention used. For example, the longer the template naming convention used the higher NRc and NLc e.g. for a naming convention involving Upper-Camel, NLc may be smaller than NLc for a naming convention involving CAPITALIZED_WITH_UNDER-SCORES, because the former has fewer words than the later.

According to one embodiment, at least one of the at least one window is an asymmetric window indicating a number words on the left of the given word and a different number of words on the right of the given word. For example, NLc is different from NRc e.g. NLc>NRc, and NLd is different from NRd e.g. NLd<NRd. This may particularly be advantageous in case the training set is generated from the corpus that is obtained from code file that have commented codes. For example, if the NLc=5 and NRc=2, more weight and influence is given to individual words on the left, which corresponds to the code, while the documentation (towards the right) receives smaller weights. That way, the more compact code gets a higher weight and the code/documentation vector is more balanced rather than being biased towards the documentation (which is by nature more verbose and thus receives a higher weight if the window is symmetric).

According to one embodiment, the building of the training set comprises: for each given word of the corpus identifying neighboring words of the corpus that are within the window of the given word, and generating pairs of inputs and outputs, wherein the input of a pair of the generated pairs comprises the given word and the output of the pair comprises a respective word of the identified neighboring words.

According to one embodiment, the method further comprises upon generating a pair of input and output performing the training, and repeating the training for further determined pairs of inputs and outputs until the corpus is fully processed. This may enable to perform in parallel the generation of the training set and the training. This may save processing resources compared to a sequential approach e.g. the generated input and outputs may be used on the fly and thus a (persistent) storage of the pairs may not be needed.

According to one embodiment, the training is performed in accordance with the skip gram model or the continuous bag-of-words, CBOW, model. This may enable prediction based method for generating the word embeddings. In case of the skip gram model, the word embeddings may be the word vectors of the matrix between the input layer and the hidden layer. In case of the skip gram model, the word embeddings may be the word vectors of the matrix between the hidden layer and the output layer.

According to one embodiment, the generating of the embeddings comprises: identifying code words of the source code by performing variable name and function name tokenization; identifying documentation words of the documentation information; representing each of the identified code and documentation words by a word embedding, resulting in the corpus-based semantic word embeddings. This may enable to identify semantically relevant code words that can be found in documentation.

According to one embodiment, the tokenization is performed based on predefined compound words configurations used for naming in the software devolvement system. This method may identify parts of method names. For example, from a function or variable named showTime, the method may extract the subparts show and time, which increase the probability to be successfully mapped to the documentation components which contains the term time.

FIG. 1 depicts a block diagram of a software development system 100 in accordance with an example of the present disclosure.

The software development system 100 comprises a version-control system 101. The version control system 101 may be configured for tracking changes in computer files and coordinating work on those files among multiple users e.g. software developers.

The version control system 101 may comprise a repository system 103 and a repository control system 102. The repository system 103 comprises a code repository 104 and metadata repository (or documentation repository) 105A. The code repository 104 is configured to store source code. The source code may, for example, be stored in one or more code files 110. The metadata repository 105A is configured to store documentation information. The documentation information 105A may, for example, be stored in one or more documentation files 111. The code files 110 may further comprise comments descriptive of code lines of the code files. The documentation information may further include these comments.

The repository control system 102 is configured to control the content of the repository system 103 and to control access to the repository system 103. For example, the repository control system 102 is configured to receive and to store documentation information in the metadata repository 105A. The documentation information may, for example, be received at the repository control system 102 from a user. The user may, for example, be at a remote development area different from the version-control system 101. In another example, the repository control system 102 is configured to enable a user to edit or change the content of one or more documentation files 111, thereby receiving inputs from the user indicative of additional or updated documentation information of the edited documentation files 111.

The repository control system 102 is configured to receive and to store source code in the code repository 104. The source code may, for example, be received at the repository control system 102 from a user. The user may, for example, be at a remote development area different from the version-control system 101. In another example, the repository control system 102 is configured to enable a user to edit or change the content of one or more code files 110, thereby receiving inputs (e.g. additional code) from the user indicative of an additional or updated source code of the edited code files 110. For example, the repository control system 102 is configured to enable developers to check source code files in and out of code repository 104. The repository control system 102 may be configured to manage code files 110 through a predefined development lifecycle.

The code and metadata repositories 104 and 105A represent a storage system or device capable of providing persistent storage of data. The repository system 103 is shown as being part of the version control system 101.

This may enable a localized control of the code and documentation files 110-111 e.g. a network connection may not be needed in order to access by the repository control system 102 the code and documentation files 110 and 111. In another example, the repository system 103 may not be part of the version control system 101. This may enable a distributed approach which may make efficient use of processing resources e.g. storage resources may be available in a first system but not available in a second system, wherein the second system has enough CPU resources. Thus distributing the components 103 and 102 on both first and second systems may be advantageous. In another example, a part of the repository system 103 may be part of the version-control system 101 e.g. the metadata repository 105A or the code repository 104 may not be part of the version control system 101. This may, for example, enable to share the content of one of the repositories with other systems.

The software development system 100 may further comprise developer systems 107A-107N. Each of the developer systems 107A-107N is communicatively connected to the version-control system 101. The repository control system 102 may enable developer systems 107A-N to store source code in code repository 104 and/or to store documentation information in metadata repository 105A. In one example, a developer system of the developer systems 107.1-N may have its own given metadata repository that stores documentation information on source code e.g. a metadata repository that is developed at the developer system 107.1. The repository control system 102 may be configured to access the content of the given metadata repository e.g. the repository control system 102 may import content of the given metadata repository to the metadata repository 105A.

The access to the code repository 104 may be independent of the access to the metadata repository 105A e.g. the code repository 104 and metadata repository 105A operate asynchronously. The content of the code repository 104 may be changed independently of changes that may occur on content of the metadata repository 105A. For example, developer system 107.1 may change a code file 110 at a given point of time, while developer system 107.N may change a documentation file 111 at another point of time.

The software development system 100 may further comprise other metadata repositories 105B-N. The metadata repositories 105B-N may comprise documentation information on code files 110 or on other code files e.g. code files of the developer systems 1071-N. For example, the metadata repositories 105B-N may be part of respective developer systems 107.1-N. The repository control system 102 may be configured to access the content of the metadata repositories 105B-N.

The repository control system 102 may comprise a visualization component 120. The visualization component 120 may be configured to display code files 110 and/or documentation files 111 on a display device of the software development system 100.

The repository control system 102 may comprise a query component 130. The query component 130 may be configured to receive search queries and to process the received search queries on the code repository 104 and metadata repositories 105A-N. For example, the result of a search query may be displayed using the visualization component 120 on a display device of the software development system 100.

FIG. 2A shows an example content of a code file 110. The code file 110 may comprise code lines. A code line may comprise one or more computer instructions. When displayed, each code line of the code file 110 may be associated with a line number 205. For example, the import statement "# include "lib1.h"" is associated with line number 1.

The code file 110 may comprise code components 201A-201N. A code component may comprise one or more code lines. For example, a code component may comprise more than one code line that defines a function or a class etc. within matching brackets.

For example, code component 201A includes import statements that perform an import function. Code component 201B comprises instructions for performing a function named "getKidsMeanWeight".

Code components of the code components 201A-N may, for example, be dependent in that a code component requires an input from another code component. For example, code component 201B calls a function "sumValues" that is defined in code component 201N. This indicates, that code component 201B and code component 201N are dependent.

The code file 110 may optionally further comprise documentation information that documents the code lines. In this example, the documentation information comprises comments 203A-N that are associated with code lines in the code file 110. For example, comments 203A document the function "getKidsMeanWeight" and comments 203N document the function "sumValues".

For example, the documentation information may comprise documentation component 203A that documents the function "getKidsMeanWeight" and code component 203N that documents the function "sumValues".

Alternatively or additionally, documentation information of the code components 201A-N may be provided in one or more separate documentation files e.g. 111, that contain only documentation information. FIG. 2B shows an example content of a documentation file 111. The documentation file 111 comprises documentation components 213A-213N.

The code components and/or documentation components shown in FIG. 2A-B may be predefined components or may dynamically be determined e.g. when performing the mapping of FIG. 3. For example, for each code line of a source code corresponding documentation line may be identified. Consecutive code lines having the same associated documentation may for a code component and consecutive documentation lines having the same code line may form a documentation component.

FIG. 3 is a flowchart of a method for mapping code to documentation information.

In step 301, an additional code may be received at the code repository 104. For example, a developer may edit one or more of the code files 110 and may insert or write the additional code in the edited files.

In step 303, documentation information for documenting the source code may be received at one or more documentation repositories 105A-N. For example, the one or more documentation repositories may comprise metadata repository 105A and/or remote metadata repositories 105B-N.

Steps 301 and 303 may be performed asynchronously. For example, steps 301 and 303 may be performed by different users at different points of time e.g. a first user may provide code e.g. the additional code, and a second user may provide documentation information of the code of the code repository 104 and/or of the code of other code repositories. This may enable a flexible solution that may seamlessly be integrated in existing systems. Using documentation information of different code for documenting the source code of the code repository 104 may be advantageous as different code may be using similar functions and libraries, and thus respective documentation may be valid for each code even if they are written in different programming languages.

In another example, steps 301 and 303 may be performed in parallel e.g. a user that creates the additional code may provide the corresponding documentation. This may speed up the mapping process which may be more accurate as the same user is writing code and documenting the code.

In step 305, word embeddings (e.g. corpus-based semantic word embeddings) or word vectors may be generated for code and documentation words of the source code and the documentation information. For example, for each code word of each file of the files 110 of the code repository 105A a word embedding may be generated. This may be advantageous as it may enable to update the vector representation of all the words of the code repository 104. In another example, a word embedding may be generated only for each code word of the additional code. This may save resources in particular if the existing files are previously mapped to respective documentation information. In another example, a word embedding may be generated only for each code word of the files 110 that have been changed by the additional code. This may particularly be advantageous, in case the additional code has changed the semantic of the changed code.

In step 307, the word embeddings may be used for mapping the source code to corresponding documentation. Using the vector representations of the words of the code and words of the documentation information may enable a systematic and accurate approach for the mapping.

In one example, the mapping may comprise synchronizing between the source code and the documentation information. This may particularly be advantageous in case the entries of documentation and code are asynchronous.

In step 309, the mapping of the source code to the corresponding documentation may be stored. The mapping may, for example, comprise a data structure having an entry for each code component of the source code of the code repository 104 and corresponding one or more documentation components of the metadata repositories 105A-N. The mapping may, for example, enable an efficient display of the source code e.g. as described with reference to FIG. 4.

In one example, steps 305, 307 and 309 may automatically be executed upon receiving the additional code. This may increase the availability of the software development system. For example, if multiple collaborating developers are using the same code repository, the automatic provision of the word embeddings and thus of the mapping may enable different users to access in time the new changes.

FIG. 4 is a diagram illustrating a method for rendering the source code of the code repository 104 in accordance with an example of the present disclosure.

The code file of FIG. 2 is rendered on a display device 403 of a user 405. For example, the visualization component 120 may render the code file 110 in a graphical user interface 407. The code file 110 is displayed without (stage 401) and with (stage 403) using the present method.

The user 405 may need to read the documentation information of the code component 201B. However, as can be seen in stage 401, the field of view of the user 405 does not allow him or her to see the documentation components 203N and 203A of the code component 201B at the same time. This is because the documentation component 203N starts at line number 1000 while the code component 201B starts at line 3.

Using the present method and as indicated in stage 403, the code component 201B is rendered in association with the documentation components 203A and 203N. This may enable a focused view of the mapping of code to documentation. In addition, this may prevent using scrolling functions and thus may save processing resources that would otherwise be required for defining such scrolling functions. For example, the source code may be displayed on page by page level without scrolling functions.

Figure 5:
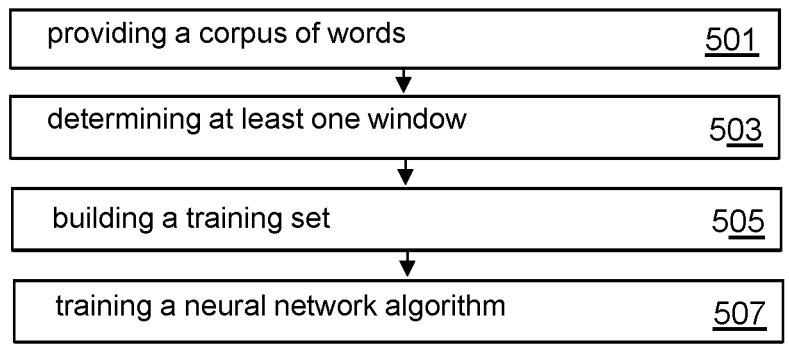
FIG. 5 is a flowchart of a method for generating of the word embeddings in accordance with the present disclosure.

FIG. 5 is a flowchart of a method for generating of the word embeddings e.g. of step 305.

In step 501, a corpus of code words of source codes and documentation words of documentation information may be provided or generated. For example, the corpus of words may be received from the software development system 100 and/or other software development systems. The corpus may comprise words in the order they are written in the code or documentation files (e.g. in accordance with the left-to-right writing pattern). The corpus may comprise unique words. The corpus may comprise code corpus of code words and documentation corpus of documentation words.

In step 503, at least one window of a predefined length indicating the number of words that can surround a given word of the corpus may be determined or defined. The window length is determined using the structure of the source code and/or the structure of documentation files.

For example, the ratio of the total amount of characters and lines of code in the source code may be calculated. The length of the window may be determined using the ratio. A low value of the ratio may indicate that the code is more readable. In this case, the window length may be small. A high value of the ratio may indicate that the code is less readable. In this case, the window may be larger. E.g. if the ratio is smaller than a predefined threshold this may indicate a low value of the ratio otherwise it may indicate a high value of the ratio.

In step 505, a training set may be built from the corpus using the determined window. An example of building the training set is described with reference to FIG. 6. For example, the at least one window may comprise a code window and a documentation window. The training set may be built by creating a first training set out of the code corpus (e.g. as described with reference to FIG. 6) using the code window and creating a second training set out of the documentation corpus (e.g. as described with reference to FIG. 6) using the documentation window. The training set of step 505 may be obtained by merging the first and second training sets.

In step 507, a neural network algorithm (e.g. having a single hidden layer, an input layer and an output layer) may be trained on the training set. The word embeddings are word vectors of a weight matrix of the neural network. For example, in case the training is performed in accordance with the skip gram model, the word embeddings are word vectors of the weight matrix between the input layer and the hidden layer of the neural network. In case the training is performed in accordance with the CBOW model, the word embeddings are word vectors of the weight matrix between the hidden layer and the output layer of the neural network.

Figure 6:
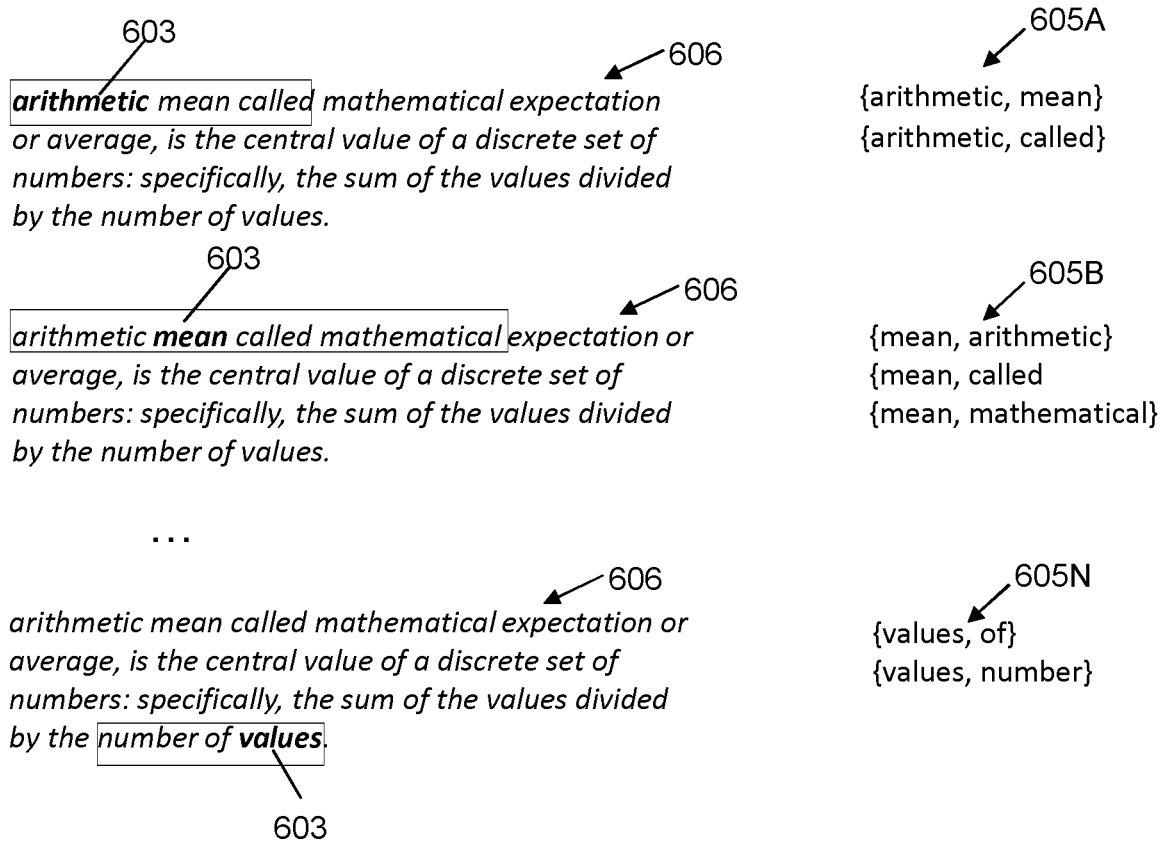
FIG. 6 illustrates a method for generating a training set in accordance with the present disclosure.

FIG. 6 illustrates a method for generating the training set of step 505. For explanation purpose, a single window 600 is shown. The window length indicates two words on the right of a given word and two words on the left of the given words. The window 600 can be used for generating the training set from the code corpus and documentation corpus. The corpus may for example comprise text passage 606. The corpus may for example be preprocessed before generating the training set. E.g. stop words may be removed from the corpus.

The window 600 as illustrated in FIG. 6, indicates a number NR of words on the right side of a given word 603 and a number NL of words on the left side of the given word 603. In this example, the numbers are NR and NL are the same and equal to two (NL=NR=2), but they may be different.

The corpus may be processed word by word following the left-to-right writing pattern. At each currently processed word, pairs of inputs and outputs may be generated as follows.

In a first stage, the given word 603 is "arithmetic" has only neighboring words on the right side. At this stage, selected neighboring words within the window 600 are "mean" and "called". The input and output pairs that can be generated are the following two pairs 605A: (arithmetic, mean) and (arithmetic, called).

In the following second stage, the given word 603 becomes "mean". The given word 603 has neighboring words on the right side and lift side. At this stage, selected neighboring words within the window 600 are "arithmetic" on the left side and "called" and "mathematical" on the right side of "mean". The input and output pairs 605B that can be generated are the following three pairs: (mean, arithmetic), (mean, called) and (mean, mathematical).

This process of determining the pairs may be repeated following the writing pattern, namely left-to-right writing pattern, until the given word 603 becomes "values". The given word 603 has neighboring words on the lift side only. At this stage, selected neighboring words within the window 600 are "of" and "number". The input and output pairs 605N that can be generated are the following two pairs: (values, of) and (values, number). The training set may comprise the generated pairs 605A-N. The same method for determining pairs may be used for different values of NL and NR.

Figure 7:
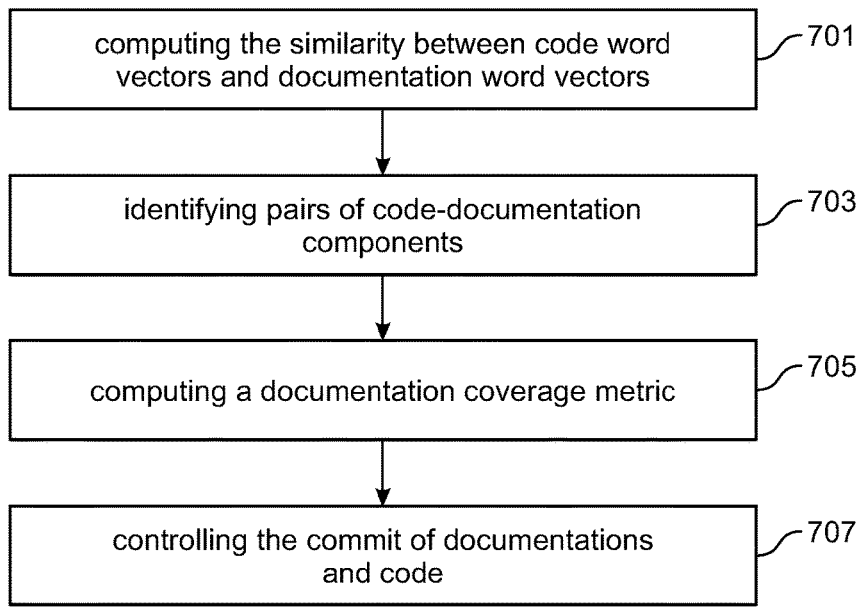
FIG. 7 is a flowchart of a method for controlling the operation of the software redevelopment system in accordance with the present disclosure.

FIG. 7 is a flowchart of a method for controlling the operation of the software redevelopment system 100.

In step 701, the similarity between the code word embeddings of code components 201A-N of the source code and the documentation word embedding of documentation components 203A-N and 213A-N of the documentation information may be computed using a predefined vector operation. The vector operation may, for example, be a cosine similarity.

Each code component may be compared to each documentation component and the most similar documentation component for each code component may be identified.

Following the example of FIGS. 2A-B, the code component 201B comprises code words like "get", "Kids", "Mean", "Weight" etc. and for each code word, a word embedding (or word vector) may be determined. The code words may be identified by performing a variable name tokenization. For that, programming-specific naming conventions may be identified. Examples are: UpperCamelCase, lowerCamelCase, CAPITALIZED_WITH_UNDERSCORES, Capitalized, lowercase_separated_by_underscores, kebab-case. The variable name tokenization identifies which kind of naming convention is used and hence splits the atom variable name accordingly. This may have the advantage, that meaning-bearing subparts of a variable name become identifiable. For example, for showTime, the algorithm extracts the subparts show and time, which increase the probability to be successfully mapped to the documentation component which contains the term time.

And for each documentation component 203A-N and 213A-N, documentation embeddings may be determined for documentation words for each documentation component. For example, documentation words may be created by lowercasing all the text of the documentation in order to increase probability of matching similar items and the lowercase plain text is then also tokenized. The similarity between documentation components and code components may be computed by comparing the vectors in a unified corpus embedding which comprises embeddings trained on both code components and documentation components. The similarity between the code component 201B and each documentation component 203A-N and 213A-N may be computed E.g. if there are 10 documentation components, 10 similarities may be computed. Each similarity e.g. between code component 201B and documentation component 203A may be computed as follows. If, for example, code component 201B comprises 5 code words (and associated 5 word embeddings) and documentation component 203A comprises 20 documentation words (and associated 20 word embeddings), the similarity may computed. For each of the 5 code word embeddings a similarity may be computed with each of the 20 documentation word embeddings and the resulting similarities may be combined (e.g. averaged) for obtaining a similarity value between the compared components.

In step 703, pairs of code components and documentation components that are similar may be identified using the computed similarity. And each code component of each identified pair may be assigned to a respective documentation component of the identified pair. Following the example above, 10 similarities may be compared with a predefined threshold, and pairs of (201B, X), X=203A, 203B . . . , 203N . . . or 213N, whose similarities higher than the threshold may be identified. Every similarity that is above a threshold of 0.3 is regarded as a mapping. Initially, only the documentation component with the highest similarity is mapped to a given code component.

In step 705, a documentation coverage metric indicative of the number of code components that are mapped to documentation components of the documentation information and the code components which are not mapped with documentation components of the documentation information may be computed.

In step 707, the documentation coverage metric may be used for controlling the commit of documentations and code in the software development system 100. The documentation coverage metric may be provided to a user for prompting the user for inputs. For example, different system actions that have to be executed by the software development system and provided to the user for receiving a selection of one of them.

In one example, steps 701-705 may be repeated e.g. each time a new code and/or documentation is added and corresponding word embeddings have been generated. This may result in a time dependent documentation coverage metric. The time dependent documentation coverage metric may be used for continuously controlling the commit of documentations and codes of the version-control system.

Figure 8:
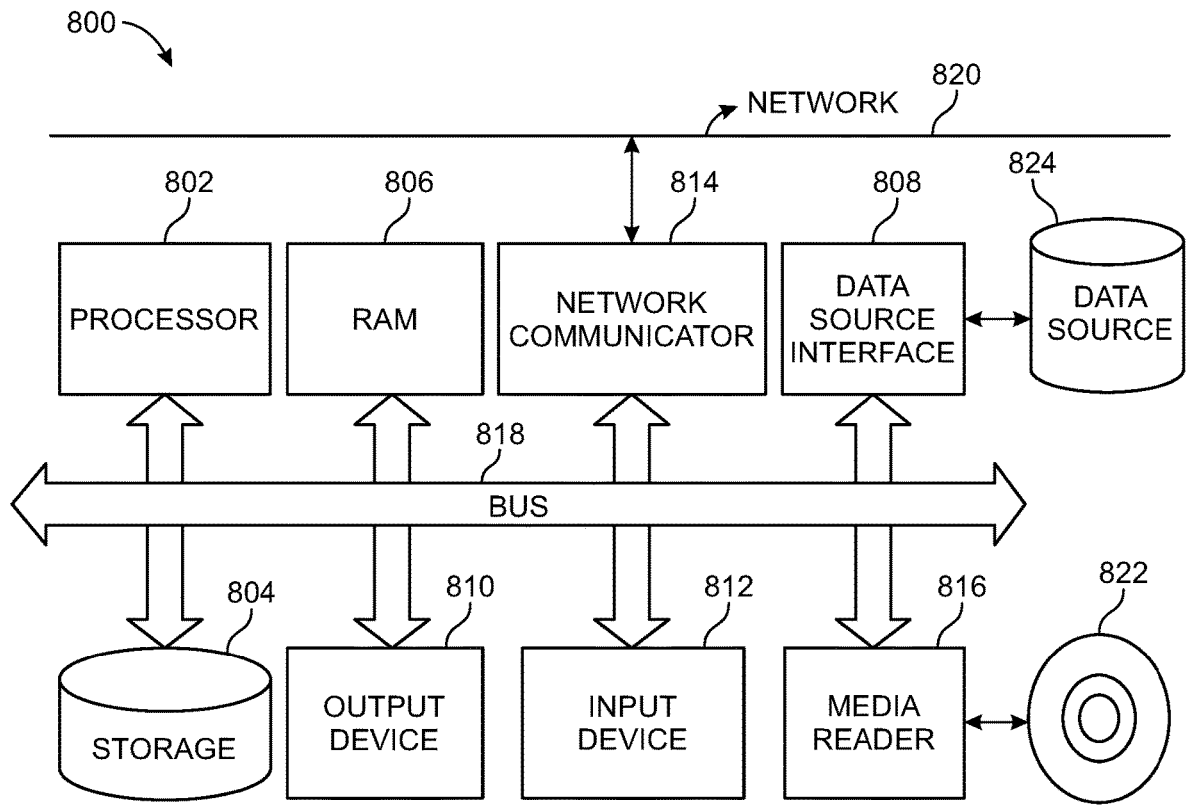
FIG. 8 is a block diagram of an exemplary computer system for implementing at least part of the present method.

FIG. 8 is a block diagram of an exemplary computer system 800 such as repository control system 102 suited for implementing at least part of method steps as involved in the disclosure. The computer system 800 includes a processor 802 that executes software instructions or code stored on a computer readable storage medium 822 to perform at least part of the above-illustrated methods. The processor 802 can include a plurality of cores. The computer system 800 includes a media reader 816 to read the instructions from the computer readable storage medium 822 and store the instructions in storage 804 or in random access memory (RAM) 806. The storage 804 provides a large space for keeping static data where at least some instructions could be stored for later execution. According to some examples, such as some in-memory computing system embodiments, the RAM 806 can have sufficient storage capacity to store much of the data required for processing in the RAM 806 instead of in the storage 804. In some embodiments, the data required for processing may be stored in the RAM 806. The stored instructions may be further compiled to generate other representations of the instructions and dynamically stored in the RAM 806. The processor 802 reads instructions from the RAM 806 and performs actions as instructed. According to one example, the computer system 800 further includes an output device 810 (e.g., a display) to provide at least some of the results of the execution as output including, but not limited to, visual information to users and an input device 812 to provide a user or another device with means for entering data and/or otherwise interact with the computer system 800. Such output devices 810 and input devices 812 could be joined by one or more additional peripherals to further expand the capabilities of the computer system 800. A network communicator 814 may be provided to connect the computer system 800 to a network 820 and in turn to other devices connected to the network 850 including other clients, servers, data stores, and interfaces, for instance. The modules of the computer system 800 are interconnected via a bus 818. Computer system 800 includes a data source interface 808 to access data source 824. The data source 824 can be accessed via one or more abstraction layers implemented in hardware or software. For example, the data source 824 may be accessed by network 820. In some examples, the data source 824 may be accessed via an abstraction layer, such as, a semantic layer.

The term "computer system" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of submodules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser. Implementations of the subject matter described in this specification can be implemented in a computing system that includes a back end component, e.g., as a data server, or that includes a middle-ware component, e.g., an application server, or that includes a front-end component, e.g., a client computer having a graphical user interface or a web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any implementation or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some causes be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

The preceding figures and accompanying description illustrate the example processes and computer implementable techniques. But example environment (or their software or other components) contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, the example environment may use processes with additional, fewer and/or different operations, as long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "control system" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of submodules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto optical disks; and CD ROM, DVD+/–R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any implementation or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some causes be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

What is claimed is:

1. A method for a software development system, the software development system comprising a code repository storing source code, the method comprising:
   receiving at the code repository an additional code;
   receiving at one or more documentation repositories documentation information for documenting the source code;
   generating corpus-based semantic word embeddings for code and documentation words of the source code and the documentation information, the generating of the corpus-based semantic word embeddings comprising:
      providing a corpus of code words of source codes and documentation words of documentation information;
      determining at least one window of a predefined length indicating a number of words that can surround a given word of the corpus, wherein the predefined length is determined using a structure of the source code and/or a structure of documentation files;
      building a training set from the corpus using the determined window; and
      training a neural network algorithm on the training set, wherein the corpus-based semantic word embeddings are word vectors of a weight matrix of the neural network;
   using the corpus-based semantic word embeddings for mapping, by the software development system, the source code to corresponding documentation; and
   storing the mapping of the source code to the corresponding documentation.

2. The method of claim 1, further comprising rendering by a visualization component of the software development system the source and the corresponding documentation, thereby enabling a focused view of the mapping of code to documentation.

3. The method of claim 1, wherein the mapping comprises: for each code component of the source code identifying zero or more documentation components of the documentation information that are semantically similar to the code component by performing a predefined vector operation on code word embeddings of the code component and documentation word embeddings of the documentation components.

4. The method of claim 1, wherein the mapping comprises for each first code component of the source code, identifying one or more second code components of the source code that are dependent of the first code component, for each component of the first and second code components identifying zero or more components of the documentation information that are semantically similar to the component by performing a predefined vector operation on code word embeddings of the component and documentation word embeddings of documentation components, and associating the identified components with the first code component of the source code.

5. The method of claim 1, wherein the mapping comprises:
computing a similarity between code word embeddings of code components of the source code and a documentation word embedding of documentation components of the documentation information using a predefined vector operation;
identifying pairs of code components and documentation components that are similar using the computed similarity; and
assigning each code component of an identified pair to a respective documentation component of the identified pair.

6. The method of claim 5, further comprising before computing the similarities, excluding code components (201A), of the source code, comprising import statements.

7. The method of claim 1, further comprising computing a documentation coverage metric indicative of a number of code components that are mapped to documentation components of the documentation information and code components which are not mapped with documentation components of the documentation information and using the documentation coverage metric for controlling a commit of documentations and codes of the software development system.

8. The method of claim 1, wherein the generating of the corpus-based semantic word embeddings comprises generating code word embeddings for code words of the source code; generating documentation word embeddings for documentation words of the documentation information, weighting the code word embeddings, and combining the weighted code word embeddings and the documentation word embeddings.

9. The method of claim 1, wherein the receiving of the additional code and the receiving of the documentation information are asynchronously performed.

10. The method of claim 1, further comprising calculating a ratio of a total amount of characters and lines of code in the source code, and using the ratio for determining the predefined length of the window.

11. The method of claim 10, wherein the window is an asymmetric window indicating a number words on a left of the given word and a different number of words on a right of the given word.

12. The method of claim 11, wherein the training is performed in accordance with a skip gram model or a continuous bag-of-words model.

13. A computer program product comprising machine executable instructions stored on a non-transitory computer-readable medium for execution by a processor, wherein execution of the machine executable instructions causes the processor to:
receive an additional code at a code repository storing source code;
receive at one or more documentation repositories documentation information for documenting the source code;
generate corpus-based semantic word embeddings for code and documentation words of the source code and the documentation information, the generating of the corpus-based semantic word embeddings comprising:
providing a corpus of code words of source codes and documentation words of documentation information;
determining at least one window of a predefined length indicating a number of words that can surround a given word of the corpus, wherein the predefined length is determined using a structure of the source code and/or a structure of documentation files;
building a training set from the corpus using the determined window; and
training a neural network algorithm on the training set, wherein the corpus-based semantic word embeddings are word vectors of a weight matrix of the neural network;
use the corpus-based semantic word embeddings for mapping, by the software development system, the source code to corresponding documentation; and
store the mapping of the source code to the corresponding documentation.

14. The computer program product of claim 13, wherein the mapping comprises, for each code component of the source code, identifying zero or more documentation components of the documentation information that are semantically similar to the code component by performing a predefined vector operation on code word embeddings of the code component and documentation word embeddings of the documentation components.

15. The computer program product of claim 13, wherein the mapping comprises, for each first code component of the source code, identifying one or more second code components of the source code that are dependent on the first code component, for each component of the first and second code components identifying zero or more components of the documentation information that are semantically similar to the component by performing a predefined vector operation on code word embeddings of the component and documentation word embeddings of documentation components, and associating the identified components with the first code component of the source code.

16. The computer program product of claim 13, wherein the mapping comprises:
computation of a similarity between code word embeddings of code components of the source code and a documentation word embedding of documentation components of the documentation information using a predefined vector operation; and
identification of pairs of code components and documentation components that are similar using the computed similarity, and assignment of each code component of an identified pair to a respective documentation component of the identified pair.

17. A system comprising:
a memory storing processor-executable instructions; and
a processor to execute the processor-executable instructions in order to cause the system to:
receive a source code;
generate corpus-based semantic word embeddings for code words of the source code and for documentation words of documentation information, the generating of the corpus-based semantic word embeddings comprising:
providing a corpus of code words of source codes and documentation words of documentation information;
determining at least one window of a predefined length indicating a number of words that can surround a given word of the corpus, wherein the predefined length is determined using a structure of the source code and/or a structure of documentation files;

building a training set from the corpus using the determined window; and training a neural network algorithm on the training set, wherein the corpus-based semantic word embeddings are word vectors of a weight matrix of the neural network;

use the corpus-based semantic word embeddings for mapping the source code to corresponding documentation; and store the mapping of the source code to the corresponding documentation.

18. The system of claim 17, wherein the mapping comprises, for each code component of the source code, identifying zero or more documentation components of the documentation information that are semantically similar to the code component by performing a predefined vector operation on code word embeddings of the code component and documentation word embeddings of the documentation components.

19. The system of claim 17, wherein the mapping comprises, for each first code component of the source code, identifying one or more second code components of the source code that are dependent on the first code component, for each component of the first and second code components identifying zero or more components of the documentation information that are semantically similar to the component by performing a predefined vector operation on code word embeddings of the component and documentation word embeddings of documentation components, and associating the identified components.

* * * * *